US008539267B2

(12) United States Patent
Cho (10) Patent No.: US 8,539,267 B2
(45) Date of Patent: Sep. 17, 2013

(54) IMAGE FORMING APPARATUS AND POWER MANAGEMENT METHOD THEREOF

(75) Inventor: Young-taek Cho, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 279 days.

(21) Appl. No.: 12/923,348

(22) Filed: Sep. 15, 2010

(65) Prior Publication Data

US 2011/0173473 A1 Jul. 14, 2011

(30) Foreign Application Priority Data

Jan. 13, 2010 (KR) .......................... 10-2010-0002999

(51) Int. Cl.
G06F 1/32 (2006.01)
(52) U.S. Cl.
USPC ........... 713/310; 713/320; 713/323; 713/324; 713/330
(58) Field of Classification Search
USPC .......................................................... 713/300
See application file for complete search history.

(56) References Cited

U.S. PATENT DOCUMENTS

| 7,447,757 | B2* | 11/2008 | Muto ............................. 709/223 |
| 7,742,179 | B2* | 6/2010 | Ikeda ............................ 358/1.14 |
| 7,873,848 | B2* | 1/2011 | Nakahara et al. .............. 713/320 |
| 7,971,079 | B2* | 6/2011 | Ezura ............................ 713/320 |
| 8,364,994 | B2* | 1/2013 | Park et al. ..................... 713/320 |
| 2004/0057069 | A1* | 3/2004 | Ikeda ............................ 358/1.14 |
| 2006/0075269 | A1* | 4/2006 | Liong et al. .................... 713/300 |
| 2007/0066338 | A1* | 3/2007 | Lee et al. ....................... 455/522 |
| 2008/0297832 | A1* | 12/2008 | Otsuka .......................... 358/1.15 |
| 2009/0210732 | A1* | 8/2009 | Aoyagi ......................... 713/320 |
| 2010/0174935 | A1* | 7/2010 | Kim et al. ..................... 713/324 |
| 2010/0211809 | A1* | 8/2010 | Shimada ....................... 713/323 |
| 2010/0218025 | A1* | 8/2010 | Saito ............................ 713/324 |
| 2011/0113267 | A1* | 5/2011 | Park et al. .................... 713/310 |
| 2011/0116398 | A1* | 5/2011 | Nakahara ..................... 370/252 |

FOREIGN PATENT DOCUMENTS

| EP | 1742425 A2 * | 1/2007 |
| KR | 2002-0060531 | 7/2002 |

OTHER PUBLICATIONS

"UPnP Low Power Achitecture"; UPnP Forum; Version 1.00; Aug. 28, 2007; all pages.*

* cited by examiner

Primary Examiner — Ryan Stiglic
(74) Attorney, Agent, or Firm — Staas & Halsey LLP (57) ABSTRACT

A power management method of an image forming apparatus which communicates with at least one terminal device supporting a universal plug and play (UPnP) protocol, including: setting power save mode information which includes a plurality of levels corresponding to the UPnP protocol to the image forming apparatus; storing the set power save mode information; receiving a command to enter a first power save mode among the plurality of levels from the terminal device; comparing the received command to enter the first power save mode with the stored power save mode information; and entering a power save mode by the image forming apparatus corresponding to the received command to enter the first power save mode. With this configuration, the image forming apparatus supporting a UPnP protocol categorizes power save modes by using a low power protocol of the UPnP protocol, and can reduce unnecessary power consumption and improves usability.

17 Claims, 8 Drawing Sheets

IMAGE FORMING APPARATUS AND POWER MANAGEMENT METHOD THEREOF

CROSS-REFERENCE TO RELATED APPLICATIONS

This application claims priority from Korean Patent Application No. 10-2010-0002999, filed on Jan. 13, 2010 in the Korean Intellectual Property Office, the disclosure of which is incorporated herein by reference.

BACKGROUND

1. Field

Apparatuses and methods consistent with the exemplary embodiments relate to an image forming apparatus and a power management method thereof, and more particularly, to an image forming apparatus and a power management method thereof which applies a universal plug and play (UPnP) protocol to a power save mode of the image forming apparatus.

2. Description of the Related Art

People are increasingly using devices enabling establishment of a home network system with a universal plug and play (UPnP) which is a standard for securing interoperability. An image forming apparatus may be utilized as a control device by using the UPnP protocol.

The image forming apparatus forms an image on a document. The image forming apparatus may include a printer, a photocopier, a facsimile, or a multi-function device which has at least two functions.

As one of power management modes, the image forming apparatus has a power save mode in which power supplied to some components is cut off to reduce power consumption when the image forming apparatus does not perform, say, a print operation during a preset standby time.

Upon a reception of a request for a print job while in the power save mode, the image forming apparatus performs the print job and again enters the power save mode only after a lapse of the preset standby time from the completion of the print job. Thus, unnecessary power consumption occurs during the standby time.

For example, even if a user needs a temporary print job such as a reception of a fax, the image forming apparatus may unnecessarily consume power until the standby time elapses after the completion of printing the received fax data.

SUMMARY

Additional aspects and/or advantages will be set forth in part in the description which follows and, in part, will be apparent from the description, or may be learned by practice of the invention.

Accordingly, one or more exemplary embodiments provide an image forming apparatus and a power management method thereof which categorizes a power save mode of the image forming apparatus supporting a universal plug and play (UPnP) using a low power protocol of the UPnP protocol, and reduces unnecessary power consumption and improves usability.

The foregoing and/or other aspects may be achieved by providing a power management method of an image forming apparatus which communicates with at least one terminal device supporting a universal plug and play (UPnP) protocol, the method including: setting power save mode information which includes a plurality of levels corresponding to the UPnP protocol to the image forming apparatus; storing the set power save mode information; receiving a command to enter a first power save mode among the plurality of levels from the terminal device; comparing the received command to enter the first power save mode with the stored power save mode information; and entering a power save mode by the image forming apparatus corresponding to the received command to enter the first power save mode.

The method may further include identifying a current level of the power save mode upon a reception of at least one job request from the image forming apparatus; and converting the power save mode to a normal mode and performing the job.

The at least one job may include at least one of a fax reception from the outside, a reception of print data, a print job for print data stored in a storage unit of the image forming apparatus, a document copy job, a fax transmission job and a document scan job.

If the at least one job is completed, the image forming apparatus may return to the power save mode according to the level of the power save mode.

The returning to the power save mode may include determining whether a standby time which is preset depending on the level of the power save mode elapses; and returning to the power save mode if the standby time elapses.

The entering the power save mode may include selectively supplying power to the image forming apparatus depending on the level of the power save mode.

The method may further include receiving a command to turn off the power save mode from the terminal device, wherein the image forming apparatus may be converted into the normal mode according to the command to turn off the power save mode.

The method may further include receiving a user interface (UI) input of the image forming apparatus, wherein the image forming apparatus may be converted into a normal mode corresponding to the input.

The plurality of levels of the power save mode may be classified according to at least one of an operation at a time of entering a power save mode, an operation at a time of requesting a job and an operation after a completion of the job, or any combination thereof.

The foregoing and/or other aspects may be achieved by providing an image forming apparatus which communicates with at least one terminal device supporting a universal plug and play (UPnP) protocol, the image forming apparatus including: a power supply unit which supplies power to the image forming apparatus; an operation panel which sets information on a power save mode having a plurality of levels corresponding to the UPnP protocol to the image forming apparatus; a storage unit which stores therein the set information of the power save mode; a communication unit which communicates with the terminal device according to the UPnP protocol and receives print data from a host device or transmits scan data to the host device; a fax unit which transmits a fax and receives a fax from/to a fax machine; and a controller which controls the power supply unit for the image forming apparatus to enter a power save mode upon a reception of a command to enter a first power save mode among the plurality of levels from the terminal device through the communication unit.

The image forming apparatus may further include an image forming unit which forms an image, wherein the controller may identify the current level of the power save mode upon a reception of at least one job request from the image forming apparatus, control the power supply unit for the image forming apparatus to be converted into a normal mode from the power save mode and control the image forming unit to perform the job.

The at least one job may include at least one of a fax reception from a fax machine, a reception of print data from the host device, a print job for print data stored in the storage unit, a document print job, a fax transmission job and a document scan job.

The controller may control the power supply unit for the image forming apparatus to return to the power save mode according to the level of the power save mode upon a completion of the at least one job.

The controller may determine whether a standby time which is preset depending on the level of the power save mode elapses, and control the power supply unit for the image forming apparatus to return to the power save mode if the standby time elapses.

The controller may control the power supply unit to selectively supply power to the image forming apparatus depending on the level of the power save mode.

The communication unit may receive a command from the terminal device to turn off the power save mode, and the controller may control the power supply unit for the image forming apparatus to be converted into a normal mode from the power save mode according to the command to turn off the power save mode.

The operation panel may receive a user interface (UI) input, and the controller may control the power supply unit for the image forming apparatus to be converted into the normal mode upon a reception of the UI input.

The plurality of levels of the power save mode may be categorized according to at least one of an operation at a time of entering the power save mode, an operation at a time of requesting a job and an operation after a completion of the job.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 3A to 5B are flowcharts of a power management method according to the exemplary embodiment.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
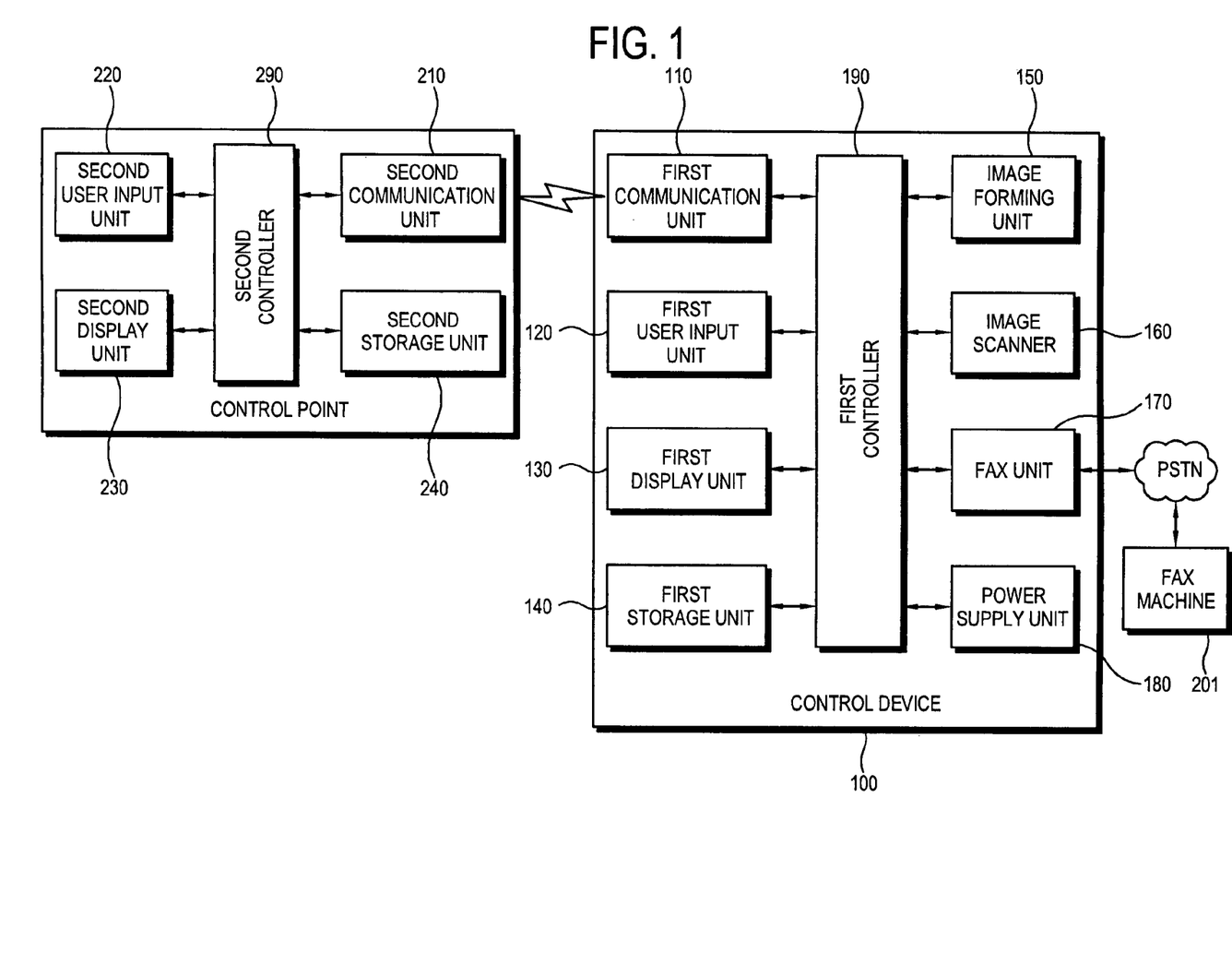
FIG. 1 is a block diagram of an image forming apparatus according to an exemplary embodiment.

FIG. 1 is a block diagram of an image forming apparatus 100 and a terminal device 200 according to an exemplary embodiment of the present invention. The image forming apparatus 100 and the terminal device 200 support a universal plug and play (UPnP) protocol and communicate with each other in a wired/wireless network.

The terminal device 200 may include a portable terminal as a control point outputting a control signal using the UPnP protocol. The terminal device 200 may include a low power control point which outputs a control signal under a low power protocol of the UPnP protocol.

The image forming apparatus 100 is a control device operating by the control signal of the control point. The image forming apparatus 100 may include a printer, a photocopier, a scanner, a facsimile or a multi-function printer (MFP) having at least two functions. The image forming apparatus 100 may include a low power UPnP device which provides a power save mode under the low power protocol of the UPnP protocol.

As shown in FIG. 1, the image forming apparatus 100 according to the exemplary embodiment includes a first communication unit 110, a first user input unit 120, a first display unit 130, a first storage unit 140, an image forming unit 150, an image scanner 160, a fax unit 170, a power supply unit 180 and a first controller 190.

The first communication unit 110 performs a data communication with the terminal device 200, a host device and an external device including a server.

More specifically, the first communication unit 110 receives a control signal according to the UPnP protocol from the control point, i.e., the terminal device 200. The received control signal is a low power control signal of the UPnP protocol. The received control signal includes a GoToSleep message and a WakeUp message to turn off the power save mode with respect to the control device, i.e., the image forming apparatus 100.

The image forming apparatus 100 according to the exemplary embodiment has a normal mode (hereinafter, to be also called ready mode) and a plurality of power save modes (hereinafter, to be also called sleep modes) corresponding to a plurality of levels as a power management mode.

In the normal mode, a power state is active and power supply is set as on state to normally supply power to elements of the image forming apparatus 100, e.g., both a user interface (UI) module and a printer module. The UI module may include the first user input unit 120 and the first display unit 130 (to be described later) or an operation panel (OPE). The printer module includes the image forming unit 150 which drives an engine and forms an image according to a print command.

Upon a reception of the GoToSleep message from the terminal device 200 through the first communication unit 110 in the normal mode, the image forming apparatus 100 enters the power save mode in which power supplied to some elements of the image forming apparatus 100, e.g., the UI module and the printer module is selectively cut off. The GoToSleep message includes a command to enter the power save mode corresponding to one of a plurality of levels as in Table 1 below.

The power save mode may be categorized as three levels as in Table 1 below. As an example of the present invention, the power save mode is categorized as three phases of a level 1 (transparent sleep), a level 2 (deep sleep online) and a level 3 (deep sleep offline).

The plurality of power save mode levels in Table 1 may use a UPnP low power architecture as a power management protocol defined in the UPnP. The image forming apparatus 100 may further have a disconnect mode in which connection for power supply to the image forming apparatus 100 is physically disconnected.

TABLE 1

| Power State | Power Management Mode | Operation at the time of entering power save mode | Operation at the request of print job | Operation after completion of print job |
|---|---|---|---|---|
| Active | Normal | UI Module: ON Printer Module: ON | UI Module: ON Printer Module: ON | UI Module: Sleep after lapse of standby time Printer Module: Sleep after lapse of standby time |
| Transparent Sleep | Level 1 | UI Module: Sleep Printer Module: Sleep | UI Module: ON Printer Module: ON | UI Module: Sleep after lapse of standby time Printer Module: Sleep after lapse of standby time |
| DeepSleep Online | Level 2 | UI Module: Sleep Printer Module: Sleep | UI Module: ON Printer Module: ON | UI Module: Sleep immediately Printer Module: Sleep immediately |
| DeepSleep Offline | Level 3 | UI Module: Sleep Printer Module: Sleep | UI Module: Sleep Printer Module: ON | UI Module: maintain Sleep state Printer Module: Sleep immediately |

As shown in Table 1 above, the power save mode of the image forming apparatus 100 is set to selectively cut off power to elements of the image forming apparatus 100, e.g., the UI module and the printer module according to the operation at the time of entering the power save mode, the operation at the request of a print job and operation after a completion of the print job.

More specifically, at the level 1 (transparent sleep), power supplied to the UI module and the printer module is cut off at the time of entering the power save mode, and power is supplied again to the UI module and the printer module upon a reception of a request for a print job. If the received print job is completed, the image forming apparatus 100 returns to the power save mode at the level 1 in which power supplied to both the UI module and the printer module is cut off after the lapse of the preset standby time.

At the level 2 (deep sleep online), power supplied to the UI module and the printer module is cut off at the time of entering the power save mode, and power is supplied again only to the printer module upon a reception of a request for a print job. If the received print job is completed, the image forming apparatus 100 returns to the power save mode at the level 3 in which the power supplied to the printer module is cut off and the UI module maintains a power-off state.

At the level 3 (deep sleep offline), power supplied to the UI module and the printer module is cut off at the time of entering the power save mode, and power is supplied again to both the UI module and the printer module upon a reception of a request for a print job. If the received print job is completed, the image forming apparatus 100 returns to the power save mode at the level 1 in which power supplied to the UI module and the printer module is cut off after elapse of preset standby time.

Regardless of the level of the power save mode, power supplied to other elements of the image forming apparatus 100 (e.g., a scan module including the image scanner 160) than the UI module and the printer module may be cut off in the power save mode and supplied again in the normal mode.

The first communication unit 110 which communicates with the terminal device 200 and the fax unit 170 which receives a fax from the outside may continue to receive power even at the time of entering the power save mode.

Referring to Table 1, the normal mode is set for the image forming apparatus 100 to enter the power save mode after a preset standby time elapses without performing the print job. The power save mode is preset as one of the level 1, level 2 and level 3 in Table 1 and stored in the first storage unit 140. Information on the standby time for entering the power save mode is preset and stored in the first storage unit 140.

The first communication unit 110 transmits power state information of the image forming apparatus 100 to the control point, i.e., the terminal device 200. The first communication unit 110 may transmit the power state information to the terminal device 200 upon an occurrence of an event such as conversion of a power mode or on a regular basis.

The first communication unit 110 may receive a Wake Up signal including a command to enter the normal mode from the terminal device 200 while the image forming apparatus 100 is in the power save mode. Upon a reception of the Wake Up signal, the image forming apparatus 100 turns into the normal mode from the power save mode, and the first communication unit 110 notifies the terminal device 200 of the normal mode of the image forming apparatus 100.

The first communication unit 110 receives print data in a predetermined print language (e.g., Printer Command Language (PCL) or Post Script (PS)) from an external PC such as the host device (including a server).

The first communication unit 110 may include a wired/wireless network communication module which is connected with the terminal device 200, or the external device such as the host device by a local connection or in a network by a predetermined protocol, or an interface connected to a portable storage medium such as a USB memory (e.g., USB port).

The first communication unit 110 may perform a scan to host function or a scan to server function to transmit a scan image to the outside such as the host device (including a server) by a predetermined protocol or perform a scan to email function to transmit the scan image to the outside or perform a scan to USB function to store the scan image in a USB memory. The data which are received from the outside through the first communication unit 110 are stored in the first storage unit 140.

The first user input unit 120 receives a user's command. The user input unit 120 may include an input button (hereinafter, to be also called "hard key") provided in the image forming apparatus 100 or a graphic user interface (hereinafter, to be also called "UI") which is generated by an execution of a predetermined application and displayed on the first display unit 130 to receive a user's input by touch.

A user may perform a log-in process inputting an ID and a password assigned for each user account through the first user input unit 120. The log-in process includes an administrator log-in process in which setting and change of all of the environments of the image forming apparatus 100 is available without an additional access limit. If a user log-in process or an administrator log-in process is performed, the image forming apparatus 100 identifies and permits a user. According to the exemplary embodiment, a user includes an administrator.

The first display unit 130 displays thereon a setting and operation status of the image forming apparatus 100. The first display unit 130 may display thereon a UI screen to receive various commands from a user.

The first display unit 130 may include a liquid crystal display (LCD), a driver (not shown) to drive the LCD and a touch panel (hereinafter, to be also called "touch screen" or "touch pad") to recognize a user's touch.

In the image forming apparatus 100, the first user input unit 120 may include an icon to be selected by a user through the touch panel of the first display unit 130. The first user input unit 120 and the first display unit 130 may be provided as a single configuration rather than separate configurations.

In the image forming apparatus 100, the single configuration of the first user input unit 120 and the first display unit 130 is also called an operation panel (OPE).

The first display unit 130 may include a local display unit which is provided in the image forming apparatus 100 and a remote display unit which is provided in the host device connected to the image forming apparatus 100 through the first communication unit 110.

If the first display unit 130 includes the remote display unit, a remote user interface (RUI) is selected as the first user input unit 120 displayed on the remote display unit. A user's command is then received from the host device connected to the image forming apparatus 100 through the first communication unit 110.

The first storage unit 140 stores therein various print data for a print job, fax data for a fax transmission, image data scanned by the image scanner 160, data received from the outside connected through the first communication unit 110, various setting information of the image forming apparatus 100 through the first user input unit 120, user registration information set for each user account, user certification information, usage authorization information, etc.

The first storage unit 140 of the image forming apparatus 100 according to the present invention may further store therein information of the power management modes in Table 1 and information of the standby time applicable to each of the power management modes.

The first storage unit 140 includes an internal storage medium such as an HDD, or an external or portable storage medium such as a USB memory, a memory card (memory stick, CF card, and a MMC), and a memory card slot.

The image forming unit 150 forms an image on paper and performs a print job according to a print command. The print job includes a print job for received fax data, a print job to copy a scanned document, and a print job for print data received from the outside through the host device including a server or print data stored in an inside (hard disk drive) or outside (USB memory stick) of the image forming apparatus 100. The print job for the print data stored in the USB memory is a direct print. The data which are stored in the USB memory or the memory card may be retransmitted to the outside through the first communication unit 110 as well as being printed.

The image scanner 160 scans a target document and generates scan data. The target document may include a document, a photo, a film, etc. The image scanner 160 may include a photo converter such as CCD and CIS and an image processor which generates an image from a document by using a signal output from the photo converter. The image scanner 160 may further include a scan motor to drive the photo converter and the image processor, and a guide.

The scan data which are scanned by the image scanner 160 may be changed into a fax signal and transmitted to an external fax machine 201 by the fax unit 170.

The fax unit 170 may include a fax communication module (e.g., modem) which converts image data generated by the image scanner 160 into a fax signal and transmits the fax signal to the external fax machine 201 (including a multi-function printer having a fax function) by using a public switched telephone network (PSTN) or receives a fax signal from the external fax machine 201. The fax data which are received through the fax unit 170 are stored in the first storage unit 140.

The power supply unit 180 supplies power to the image forming apparatus 100 according to the power mode. The power supply unit 180 may selectively supply power to some elements of the image forming apparatus 100 (e.g., UI module) to correspond to the level of the power save mode according to a control of the first controller 190.

The first controller 190 controls the image forming apparatus 100 as a whole.

More specifically, the first controller 190 receives a message including a command to convert into the power mode from the terminal device 200 through the first communication unit 110, and converts into the power mode of the image forming apparatus 100 according to the received command.

The first controller 190 may include a UPnP stack to process relevant operations of the UPnP protocol, a power management module for a management of power, and an event handler to handle an event such as conversion of the power mode or a print command.

The first controller 190 controls the first communication unit 110 to notify the terminal device 200 of the power mode status information of the image forming apparatus 100. The first controller 190 may control the first communication unit 110 to transmit the power mode status information to the terminal device 200 upon an occurrence of the event such as the conversion of the power mode or at a preset period.

Upon a reception of a request for a print job while in the power save mode, the first controller 190 identifies the current level of the power save mode, and converts the power save mode into the normal mode and supplies power to the elements of the image forming apparatus 100.

According to the identified level of the power save mode, the first controller 190 may selectively supply power to the elements of the image forming apparatus 100.

For example, referring to Table 1, if the identified power save mode is the level 1 or the level 2, the first controller 190 supplies power to both the UI module (operation panel) and the printer module (image forming unit 150). If the identified module is the level 3, the first controller 190 may cut off power supplied to the UI module (operation panel) and supply power only to the printer module (image forming unit 150).

The first controller 190 controls the image forming unit 150 to perform such job as a print job when the image forming apparatus 100 converts into the normal mode.

If the job is completed, the image forming apparatus 100 returns to the power save mode. The level of the returned power save mode becomes a level of the power save mode which was set before the reception of the job request.

The first controller 190 may selectively apply the standby time according to the identified level of the power save mode in returning to the power save mode.

For example, referring to Table 1, if the identified power save mode is the level 1, the first controller 190 cuts off power supplied to the UI module (operation panel) and the printer module (image forming unit 150) in the event that the preset standby time elapses. If the identified power save mode is the level 2, the first controller 190 cuts off power supplied to the UI module (operation panel) and the printer module (image forming unit 150) upon the completion of the job without application of the standby time. If the identified power save mode is the level 3, the first controller 190 cuts off power supplied to the printer module (image forming unit 150) upon the completion of the job without application of the standby time, and has the UI module (operation panel) maintain the power-off state.

Accordingly, the image forming apparatus 100 according to the present invention categorizes the power save mode into the levels 1 to 3, selectively supplies power to the elements of the image forming apparatus 100 upon a reception of the job request in the power save mode, and returns to the power save mode immediately after the completion of the job without application of the standby time to thereby reduce unnecessary power consumption during the standby time.

As shown in FIG. 1, the terminal device 200 includes a second communication unit 210, a second user input unit 220, a second display unit 230, a second storage unit 240 and a second controller 290.

The second communication unit 210 performs a data communication with the terminal device 200.

More specifically, the second communication unit 210 transmits a GoToSleep message and a Wake Up message to turn off the power save mode as a low power control signal under the UPnP protocol to a control device, i.e., the image forming apparatus 100 and receives power state information from the image forming apparatus 100 by a user's manipulation. The second communication unit 210 may receive the power state signal from the image forming apparatus 100 upon an occurrence of an event such as a conversion of a power mode or on a regular basis.

The second user input unit 220 receives a user's command. The received command may include the GoToSleep message or a command to turn off the power save mode with respect to the image forming apparatus 100.

The second user input unit 220 may include an input button (hereinafter, to be also called "hard key") provided in the terminal device 200 or a graphic user interface (hereinafter, to be also called "UI") which is generated by an execution of a program such as an application and displayed on the second display unit 230 to receive a user's input by touch.

The second display unit 230 may display thereon a setting and operation status of the UPnP control device including the image forming apparatus 100, and a UI screen to receive a user's command to control the UPnP.

The second display unit 230 may include a liquid crystal display (LCD), a driver (not shown) to drive the LCD and a touch panel (hereinafter, to be also called "touch screen" or "touch pad") to recognize a user's touch.

The second storage unit 240 stores therein the power management mode information of the image forming apparatus 100. The second storage unit 240 includes an internal or portable storage medium.

The second controller 290 controls the terminal device 200 as a whole.

More specifically, upon a reception of a user command to enter the power save mode at a predetermined level or to turn off the power save mode through the second user input unit 220, the second controller 290 controls the second communication unit 210 to transmit a corresponding message. The second controller 290 controls the second communication unit 210 to receive the power state information from the image forming apparatus 100.

The second controller 290 may include a UPnP stack to process the relevant operations of the UPnP protocol, and control devices in a home network supporting the UPnP according to the UPnP as well as controlling the image forming apparatus 100.

Figure 2:
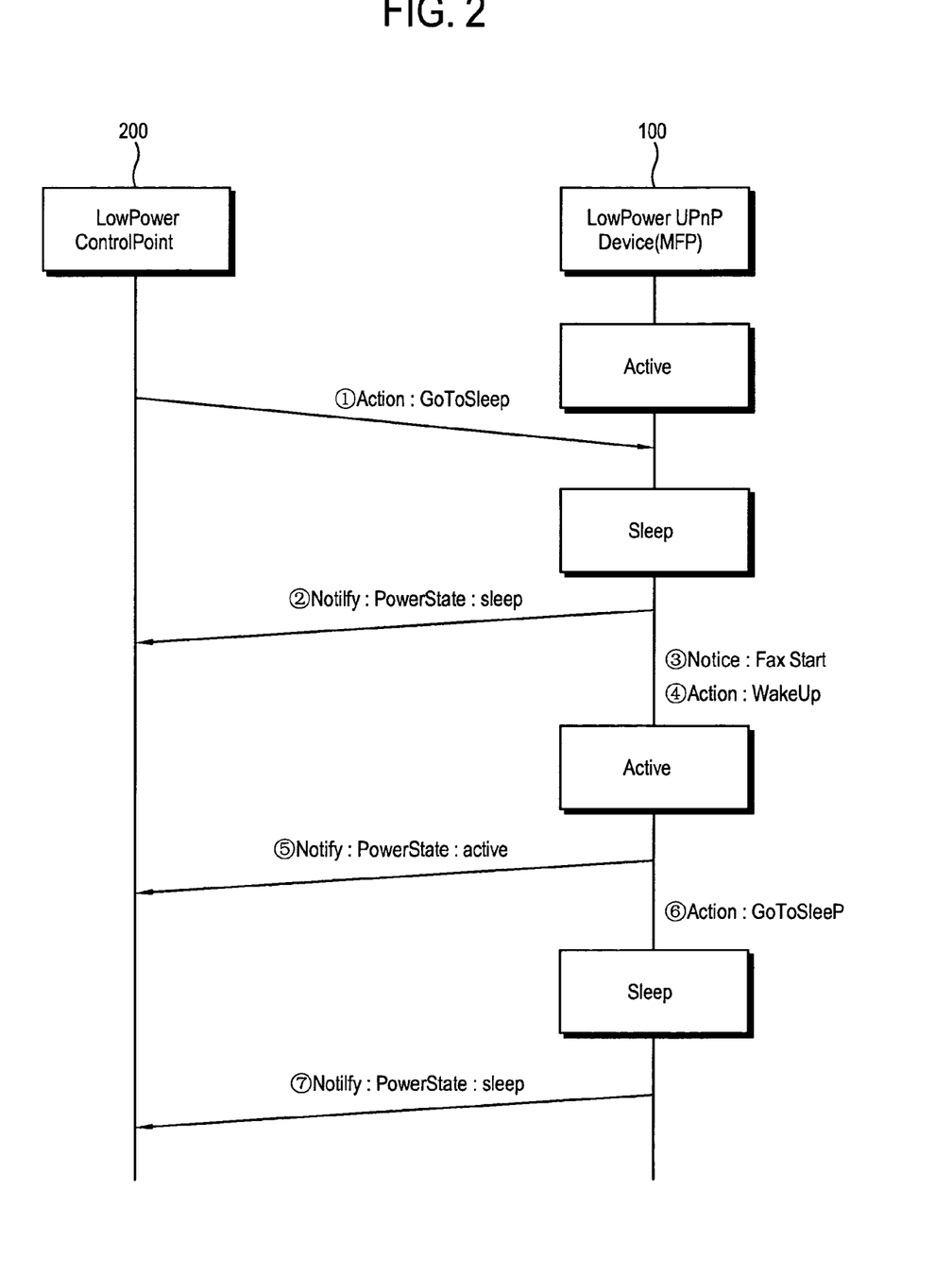
FIG. 2 sequentially illustrates processing of entering and returning to a power save mode according to the exemplary embodiment.

FIG. 2 sequentially illustrates processes of converting into and returning to the power mode according to the exemplary embodiment.

As shown therein, the image forming apparatus 100, i.e., the low power UPnP device may receive the command to enter the power save mode corresponding to the particular level from the terminal device 200, i.e., the low power control point in the active state as the normal mode (1. Action: GoToSleep).

For example, a user may transmit the command for the image forming apparatus 100 to enter the power save mode at a particular level by using the portable terminal device 200 supporting the UPnP protocol before he/she goes out.

A user may transmit the command to enter the power save mode to other electronic devices which are controlled by the UPnP protocol as well as to the image forming apparatus 100.

A user may conveniently convert the power mode of the image forming apparatus 100 and other devices in the home network through the portable terminal device 200 without manipulating the devices individually.

The image forming apparatus 100 enters the power save mode and is in a sleep state corresponding to the GoToSleep message transmitted from the terminal device 200.

The image forming apparatus 100 notifies the terminal device 200 of the sleep state according to the entry to the power save mode at the particular level (2. Notify: PowerState: sleep).

The image forming apparatus 100 may receive a job command requiring a print operation in the sleep state. For example, the image forming apparatus 100 may receive a fax from the outside as in FIG. 2.

More specifically, the image forming apparatus 100 detects the reception of the fax through the fax unit 170 (3. Notice: Fax Start).

As the fax is received, the image forming apparatus 100 is converted into the wake up state from the sleep state (4. Action: WakeUp).

Upon the wakeup, the image forming apparatus 100 goes to the active state.

The image forming apparatus 100 may selectively supply power to some elements according to the level in the sleep state. For example, if a fax is received at the level 3 in Table 1, power is supplied to the printer module (i.e., image forming unit 150) but the UI module (i.e., OPE) does not receive power and may maintain the sleep state.

The image forming apparatus 100 notifies the terminal device 200 of the active state according to the wake up (2. Notify: PowerState: active).

The image forming apparatus 100 prints the received fax data through the image forming unit 150 in the active state.

If the print job for the fax data is completed, the image forming apparatus 100 returns to the power save mode at the particular level (6. Action: GoToSleep). The level of the returned power save mode corresponds to the level before the wake up according to the reception of the fax and the standby time may selectively apply depending on the level.

For example, if the image forming apparatus 100 prints the fax data at the level 1 in Table 1, it returns to the power save mode after the lapse of the preset standby time. In the case of the levels 2 and 3, the image forming apparatus 100 returns to the power save mode immediately after the completion of the print job for the fax data without application of the standby time.

After returning to the power save mode, the image forming apparatus 100 is in the sleep state and notifies the terminal device 200 of the foregoing (7. Notify: PowerState: sleep).

With the foregoing configuration, a power management process of the image forming apparatus 100 will be described with reference to FIGS. 3A to 5B.

Figure 3A:
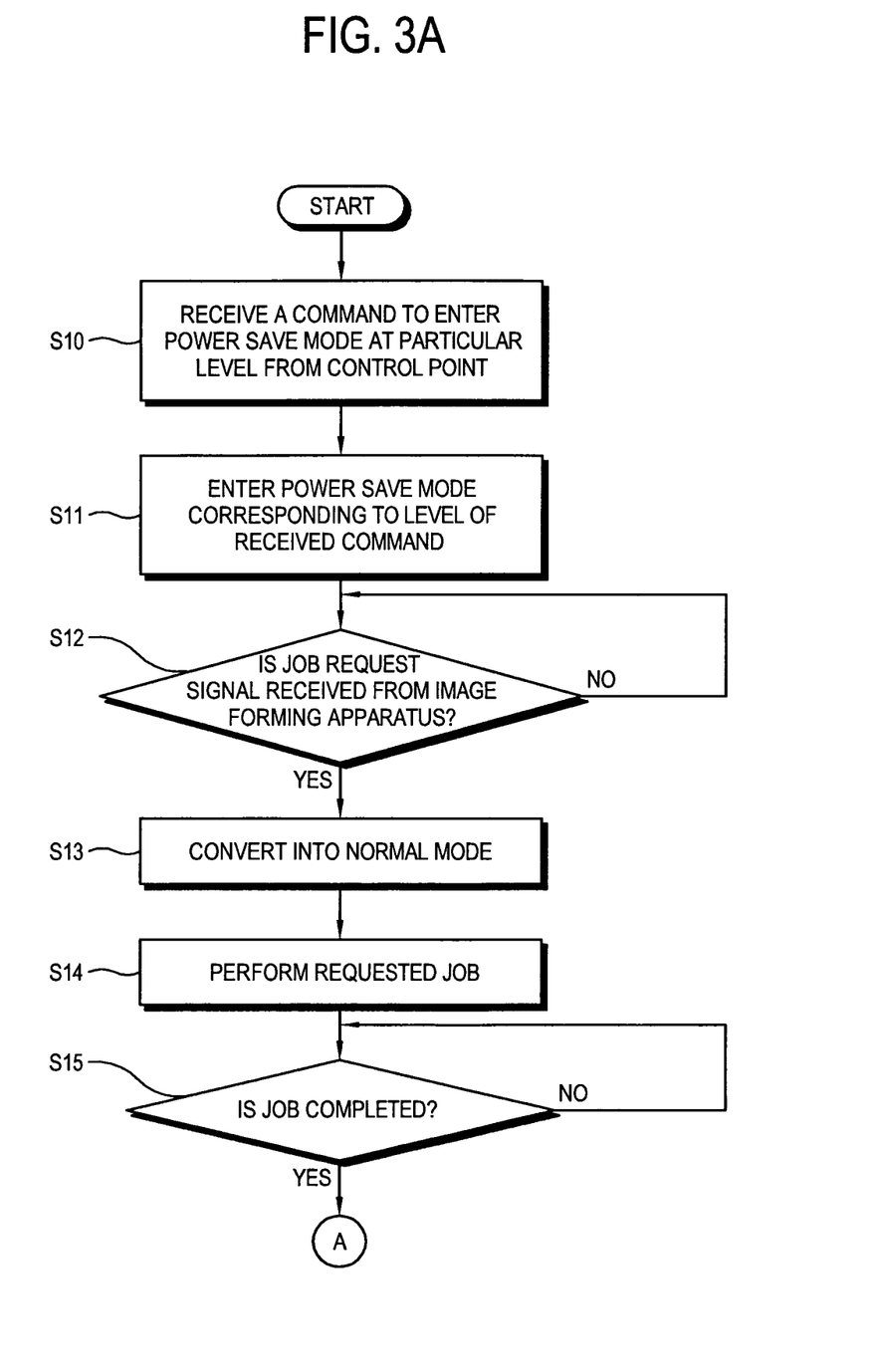
Figure 3B:
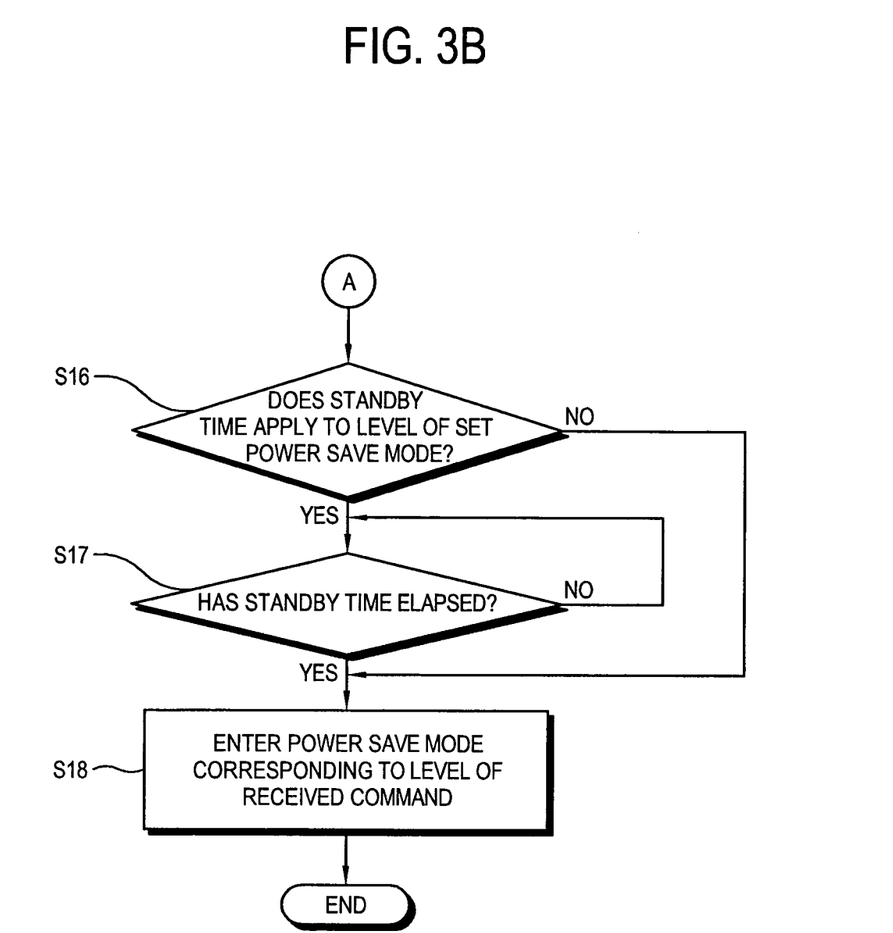

As shown in FIGS. 3A and 3B, the image forming apparatus 100 which supports the UPnP protocol may receive the command to enter the power save mode at the particular level (e.g., command to enter a first power save mode) from the control point, i.e., the terminal device 200 through the first communication unit 110 (S10). The information on the level of the power save mode may be preset as in Table 1 and stored in the first storage unit 140 of the image forming apparatus 100.

The image forming apparatus 100 compares the command to enter the first power save mode received at operation S10 with the prestored power save mode information, and enters the power save mode corresponding to the level of the received command (S11).

While the image forming apparatus 100 is in the power save mode, the first controller 190 may detect whether at least one job request signal is received from the image forming apparatus 100 (S12). The job request signal may include a reception of a fax from the outside, a reception of print data from the host device, a print command for the print data stored in the first storage unit 140, a document copy command, a fax transmission command and a document scan command.

Upon the reception of the job request signal at operation S12, the image forming apparatus 100 is converted into the normal mode (S13).

The first controller 190 controls the image forming unit 150 to perform the requested job while in the normal mode (S14). If the requested job includes copy, fax transmission and scan jobs, the first controller 190 may control the image scanner 160.

The first controller 190 determines whether the job at operation S14 is completed (S15).

If the job is completed at operation S15, the first controller 190 may determine whether to apply the standby time according to the level of the power save mode set at operation S11 (S16). More specifically, referring to Table 1, the first controller 190 determines that the standby time applies if the power save mode is the level 1, and determines that the standby time does not apply if the power save mode is the level 2 or 3. The standby time information is preset and stored in the first storage unit 140.

If the standby time applies at operation S16, i.e., if the power save mode is the level 1, the first controller 190 determines whether the preset standby time elapses (S17).

If it is determined that the preset standby time elapses at operation S17, the first controller 190 enters, i.e., returns to the power save mode corresponding to the level of the command received at operation S10, i.e., corresponding to the level at operation S11 (S18).

If the standby time does not apply at operation S16, i.e., if the power save mode is the level 2 or 3, the first controller 190 enters, i.e., returns to the power save mode corresponding to the level of the command received at operation S10, i.e., corresponding to the level at operation S11 (S18) immediately upon completion of the print job at operation S15.

As in the exemplary embodiment in FIGS. 3A and 3B, the image forming apparatus 100 selectively applies the standby time after the completion of the job according to the conversion of the normal mode depending on the level of the power save mode and reduces power consumption during the standby time.

Figure 4A:
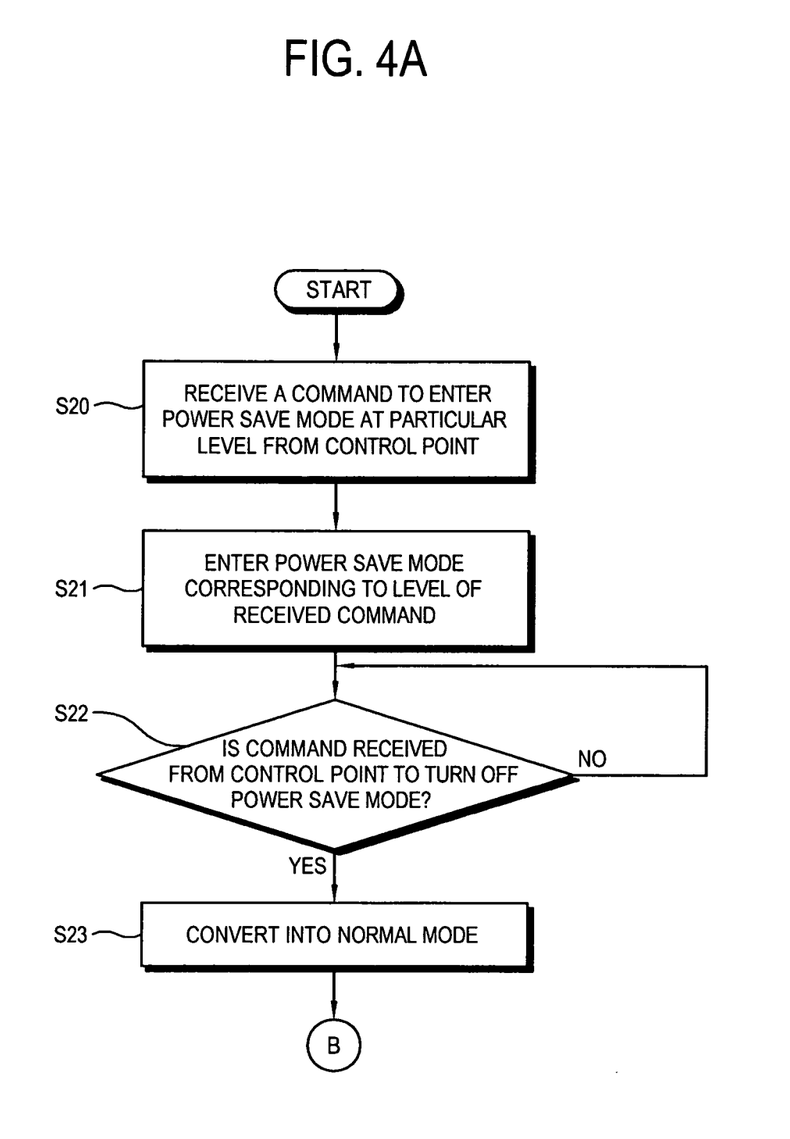
Figure 4B:
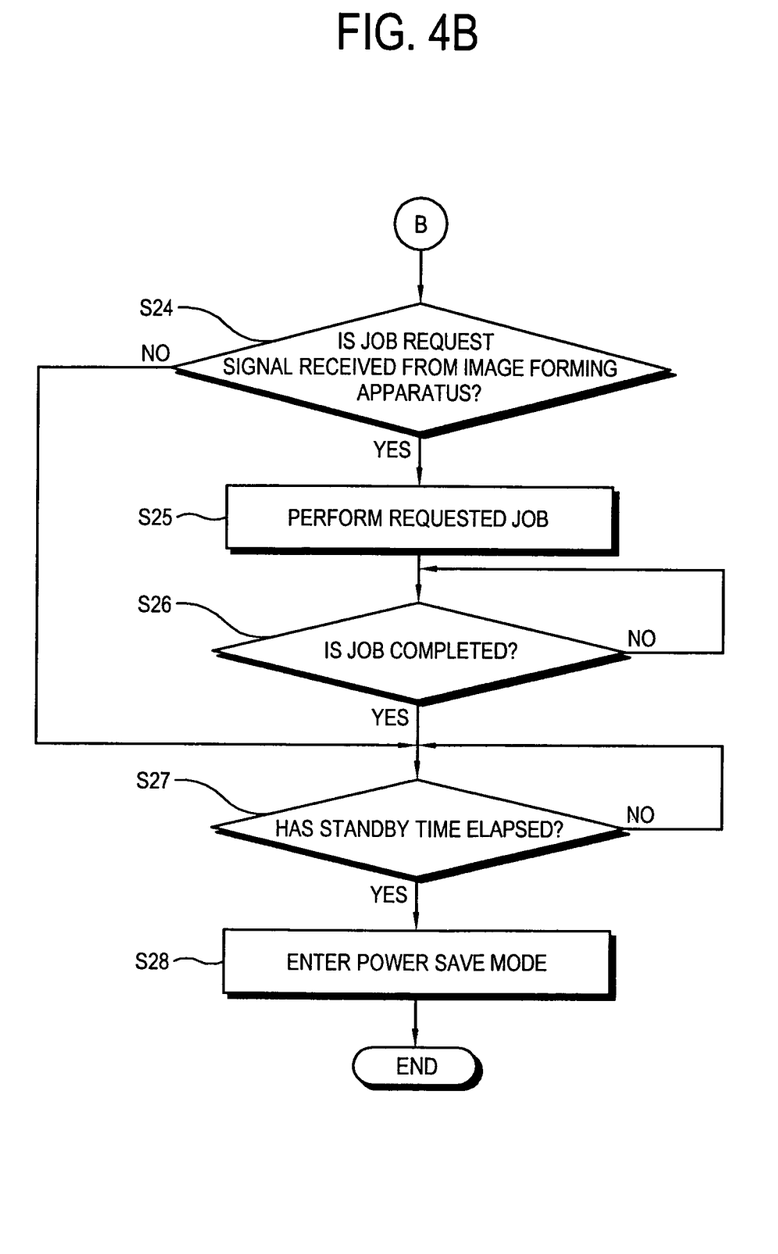

As shown in FIGS. 4A and 4B, the image forming apparatus 100 which supports the UPnP protocol may receive a command to enter the power save mode at the particular level from the control point, i.e., the terminal device 200 through the first communication unit 110 (S20). The information on the level of the power save mode may be preset as in Table 1 and stored in the first storage unit 140 of the image forming apparatus 100.

The image forming apparatus 100 compares the command to enter the power save mode received at operation S20 with the prestored power save mode information, and enters the power save mode corresponding to the level of the received command (S21).

While the image forming apparatus 100 is in the power save mode, the first controller 190 may detect whether the command to turn off the power save mode is received from the control point, i.e., the terminal device 220 through the first communication unit 110 (S22).

If the command to turn off the power save mode is received at operation S22, the image forming apparatus 100 is converted into the normal mode (S23).

While the image forming apparatus 100 is in the normal mode, the first controller 190 may detect whether at least one job request signal is received from the image forming apparatus 100 (S24). The job request signal may include a reception of a fax from the outside, a reception of print data from the host device, a print command for the print data stored in the first storage unit 140, a document copy command, a fax transmission command and a document scan command.

Upon the reception of the job request signal at operation S24, the first controller 190 controls the image forming unit 150 to perform the job (S25).

The first controller 190 determines whether the job at operation S25 is completed (S26).

If the job is completed at operation S26, the first controller 190 determines whether the preset standby time elapses (S27). The standby time information is preset, e.g., as 3600 seconds and stored in the first storage unit 140.

If it is determined that the preset standby time elapses at operation S27, the first controller 190 enters the power save mode corresponding to the particular level (S28). The level of the power save mode may be set as a default and stored in the first storage unit 140.

Figure 5A:
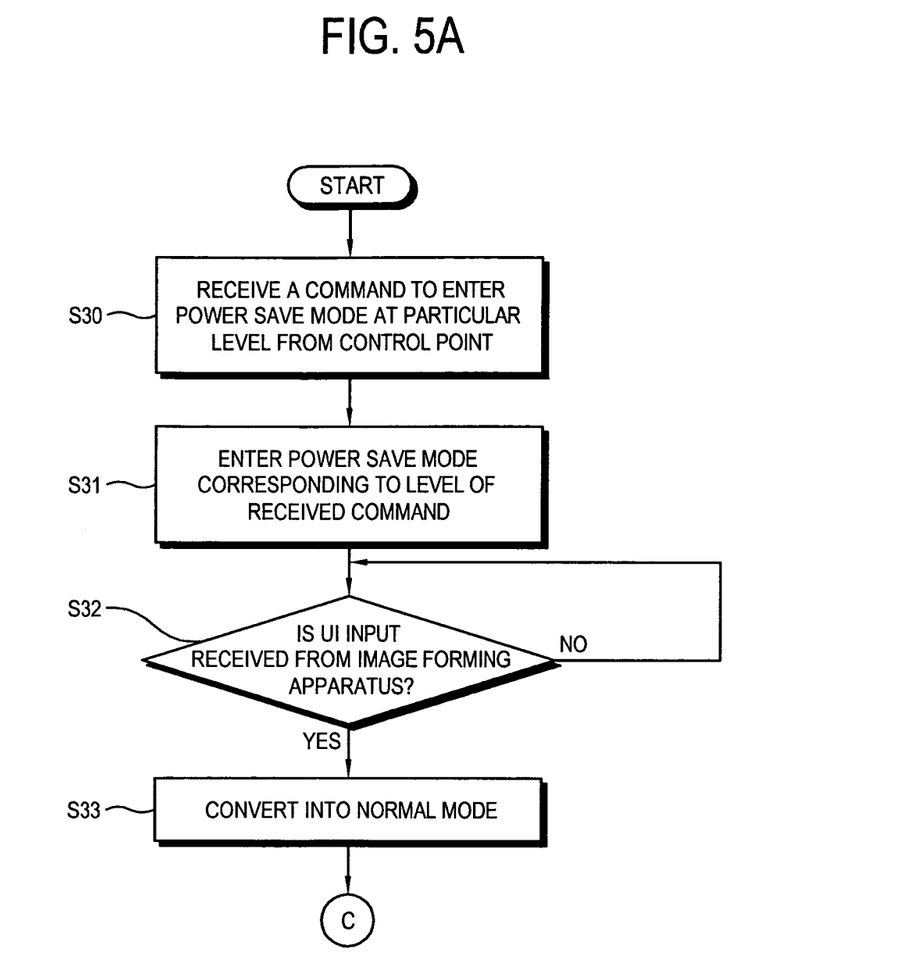
Figure 5B:
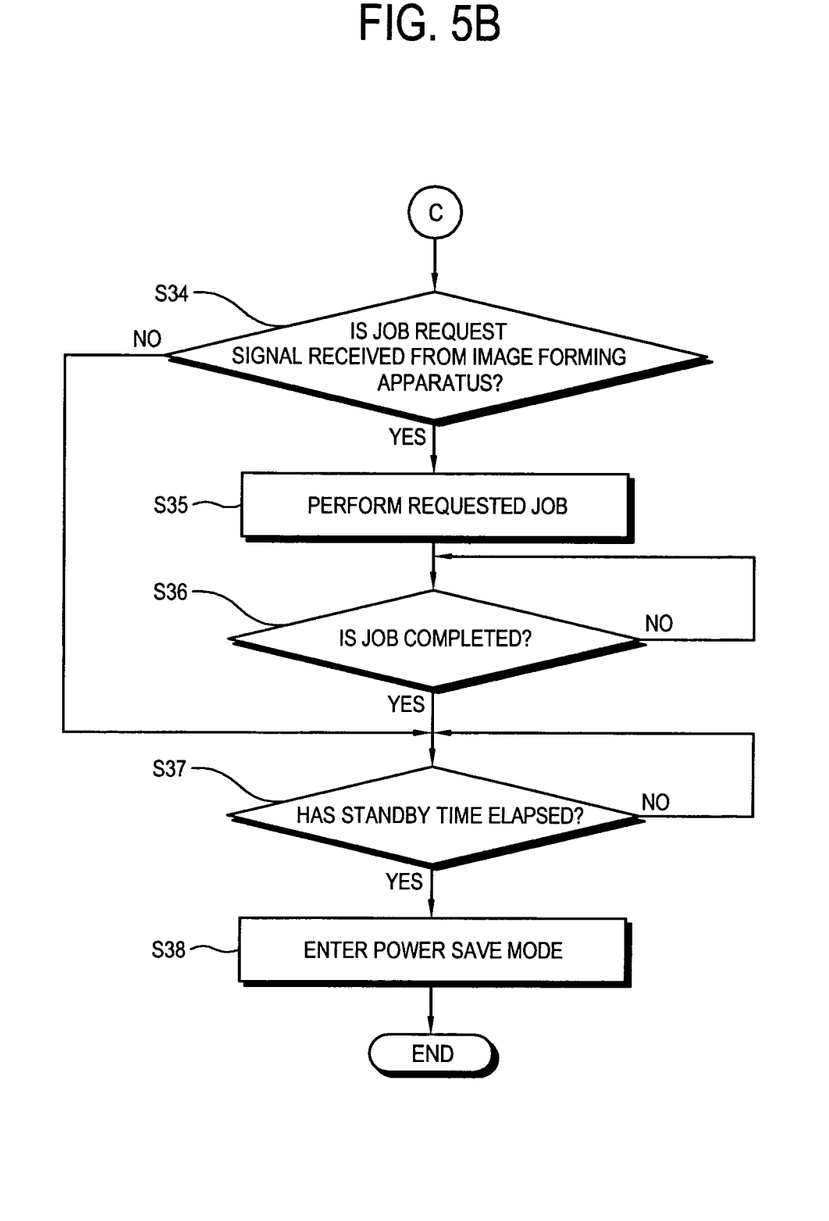

As shown in FIGS. 5A and 5B, the image forming apparatus 100 which supports the UPnP protocol may receive a command to enter the power save mode at the particular level from the control point, i.e., the terminal device 200 through the first communication unit 110 (S30). The information on the level of the power save mode may be preset as in Table 1 and stored in the first storage unit 140 of the image forming apparatus 100.

The image forming apparatus 100 compares the command to enter the power save mode received at operation S30 with the prestored power save mode information, and enters the power save mode corresponding to the level of the received command (S31).

While the image forming apparatus 100 is in the power save mode, the first controller 190 may detect a reception of an UI input with respect to the first user input unit 120 of the image forming apparatus 100 (S32). The UI input may include a command to perform a particular job supported by the image forming apparatus 100, a command to log in to the image forming apparatus 100 and a command to select a particular menu from the first display unit 130 as well as the command to turn off the power save mode.

Upon the reception of the UI input at operation S32, the image forming apparatus 100 is converted into the normal mode corresponding to the input (S33).

While the image forming apparatus 100 is in the normal mode, the first controller 190 may detect a reception of at least one job request signal from the image forming apparatus (S34). The job request signal may include a reception of a fax from the outside, a reception of print data from the host device, a print command for the print data stored in the first storage unit 140, a document copy command, a fax transmission command and a document scan command.

Upon the reception of the job request signal at operation S34, the first controller 190 controls the image forming unit 150 to perform the job (S35).

The first controller 190 determines whether the print job at operation S35 is completed (S36).

If the job at operation S36 is completed, the first controller 190 determines whether the preset standby time elapses (S37).

If the job request signal is not received at operation S34, the first controller 190 determines whether the preset standby time elapses without performing other operations (S37).

The standby time information is preset, e.g., as 3600 seconds and stored in the first storage unit 140.

If it is determined that the preset standby time elapses at operation S37, the first controller 190 enters the power save mode corresponding to the particular level (S38). The level of the power save mode may be set as a default and stored in the first storage unit 140.

As in the exemplary embodiment in FIGS. 4A-5B, the image forming apparatus 100 may be converted into the normal mode from the power save mode by using the portable terminal device 200 or by simple manipulation such as the UI input of the image forming apparatus 100.

As described above, an image forming apparatus and a power management method thereof according to the present invention categorizes power save modes of the image forming apparatus supporting a universal plug and play (UPnP) protocol by using a low power protocol of the UPnP protocol, and reduces unnecessary power consumption and improves usability.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A power management method of an image forming apparatus which communicates with at least one terminal device supporting a universal plug and play (UPnP) protocol, the method comprising:
setting power save mode information which comprises a plurality of levels corresponding to the UPnP protocol to the image forming apparatus;
storing the set power save mode information;
receiving a command to enter a first power save mode among the plurality of levels from the terminal device;
comparing the received command to enter the first power save mode with the stored power save mode information; and
entering a power save mode by the image forming apparatus corresponding to the received command to enter the first power save mode,
wherein each of the plurality of levels of the power save mode is set to selectively cut off power to a plurality of elements of the image forming apparatus instantaneously and without a standby time according to at least one of an operation at a time of entering a power save mode, an operation at a time of requesting a job and an operation after a completion of the job.

2. The method according to claim 1, further comprising identifying a current level of the power save mode upon a reception of at least one job request from the image forming apparatus; and
converting the power save mode to a normal mode and performing the job.

3. The method according to claim 2, wherein the at least one job comprises at least one of a fax reception from the outside, a reception of print data, a print job for print data stored in a storage unit of the image forming apparatus, a document copy job, a fax transmission job and a document scan job.

4. The method according to claim 2, wherein if the at least one job is completed, the image forming apparatus returns to the power save mode according to the level of the power save mode.

5. The method according to claim 4, wherein the returning to the power save mode comprises determining whether a standby time which is preset depending on the level of the power save mode elapses; and
returning to the power save mode if the standby time elapses.

6. The method according to claim 1, wherein the entering the power save mode comprises selectively supplying power to the image forming apparatus depending on the level of the power save mode.

7. The method according to claim 1, further comprising receiving a command to turn off the power save mode from the terminal device, wherein
the image forming apparatus is converted into the normal mode according to the command to turn off the power save mode.

8. The method according to claim 1, further comprising receiving a user interface (UI) input of the image forming apparatus, wherein
the image forming apparatus is converted into a normal mode corresponding to the input.

9. An image forming apparatus which communicates with at least one terminal device supporting a universal plug and play (UPnP) protocol, the image forming apparatus comprising:
a power supply unit which supplies power to the image forming apparatus;
an operation panel which sets information on a power save mode having a plurality of levels corresponding to the UPnP protocol to the image forming apparatus;
a storage unit which stores therein the set information of the power save mode;
a communication unit which communicates with the terminal device according to the UPnP protocol and receives print data from a host device or transmits scan data to the host device;
a fax unit which transmits a fax and receives a fax from/to a fax machine; and
a controller which controls the power supply unit for the image forming apparatus to enter a power save mode upon a reception of a command to enter a first power save mode among the plurality of levels from the terminal device through the communication unit,
wherein each of the plurality of levels of the power save mode is set to selectively cut off power to a plurality of elements of the image forming apparatus instantaneously and without a standby time according to at least one of an operation at a time of entering the power save mode, an operation at a time of requesting a job and an operation after a completion of the job.

10. The image forming apparatus according to claim 9, further comprising an image forming unit which forms an image,
wherein the controller identifies the current level of the power save mode upon a reception of at least one job request from the image forming apparatus, controls the power supply unit for the image forming apparatus to be converted into a normal mode from the power save mode and controls the image forming unit to perform the job.

11. The image forming apparatus according to claim 10, wherein the at least one job comprises at least one of a fax reception from a fax machine, a reception of print data from the host device, a print job for print data stored in the storage unit, a document print job, a fax transmission job and a document scan job.

12. The image forming apparatus according to claim 10, wherein the controller controls the power supply unit for the image forming apparatus to return to the power save mode according to the level of the power save mode upon a completion of the at least one job.

13. The image forming apparatus according to claim 12, wherein the controller determines whether a standby time which is preset depending on the level of the power save mode elapses, and controls the power supply unit for the image forming apparatus to return to the power save mode if the standby time elapses.

14. The image forming apparatus according to claim 9, wherein the controller controls the power supply unit to selectively supply power to the image forming apparatus depending on the level of the power save mode.

15. The image forming apparatus according to claim 9, wherein the communication unit receives a command from the terminal device to turn off the power save mode, and the controller controls the power supply unit for the image forming apparatus to be converted into a normal mode from the power save mode according to the command to turn off the power save mode.

16. The image forming apparatus according to claim 9, wherein the operation panel receives a user interface (UI) input, and the controller controls the power supply unit for the image forming apparatus to be converted into the normal mode upon a reception of the UI input.

17. A power management method of an image forming apparatus which communicates with at least one terminal device supporting a universal plug and play (UPnP) protocol, the method comprising:

setting power save mode information which comprises a plurality of levels corresponding to the UPnP protocol to the image forming apparatus;

selectively applying a standby time after completion of a job according to the level of the power save mode requested from a control point; and entering a power save mode of the image forming apparatus according to the level of the power save mode requested from the control point after the standby time has elapsed, wherein each of the plurality of levels of the power save mode is set to selectively cut off power to a plurality of elements of the image forming apparatus instantaneously and without a standby time according to at least one of an operation at a time of entering a power save mode, an operation at a time of requesting a job and an operation after a completion of the job.

* * * * *